(12) United States Patent
Peng et al.

(10) Patent No.: US 12,704,655 B2
(45) Date of Patent: Aug. 11, 2026

(54) SEISMIC DATA PROCESSING USING DUNET

(71) Applicant: CGG SERVICES SAS, Massy Cedex (FR)

(72) Inventors: Hanyuan Peng, Paris (FR); Jeremie Messud, Palaiseau (FR); Céline Lacombe, Massy (FR); Paulien Jeunesse, Antony (FR)

(73) Assignee: CGG SERVICES SAS, Massy Cedex (FR)

( * ) Notice: Subject to any disclaimer, the term of this patent is extended or adjusted under 35 U.S.C. 154(b) by 1232 days.

(21) Appl. No.: 17/342,799

(22) Filed: Jun. 9, 2021

(65) Prior Publication Data

US 2022/0221609 A1 Jul. 14, 2022

Related U.S. Application Data

(60) Provisional application No. 63/137,435, filed on Jan. 14, 2021.

(51) Int. Cl.
*G01V 1/38* (2006.01)
*G01V 1/30* (2006.01)
(Continued)

(52) U.S. Cl.
CPC .............. *G01V 1/3808* (2013.01); *G01V 1/30* (2013.01); *G01V 1/3843* (2013.01); *G06N 3/04* (2013.01);
(Continued)

(58) Field of Classification Search
CPC ...... G01V 1/30; G01V 1/3808; G01V 1/3843; G01V 2210/1293; G01V 2210/56;
(Continued)

(56) References Cited

U.S. PATENT DOCUMENTS

2021/0063594 A1* 3/2021 Wang ........................ G06N 3/08
2022/0192517 A1* 6/2022 Vader .................. A61B 5/0066

OTHER PUBLICATIONS

Huang et al., "Machine Learning Using U-Net Convolutional Neural Networks for the Imaging of Sparse Seismic Data", Jan. 15, 2020, Pure Appl. Geophys. 177, vol. 177, pp. 2685-2700/ (Year: 2020).*

(Continued)

*Primary Examiner* — Brent Johnston Hoover
(74) *Attorney, Agent, or Firm* — PATENT PORTFOLIO BUILDERS PLLC

(57) ABSTRACT

A DUnet engine produces a processed image of seismic data acquired over an underground formation. The DUnet engine includes: a contractive path that performs multilayer convolutions and contraction to extract a code from the seismic data input to the DUnet, an expansive path configured to perform multilayer convolutions and expansion of the code, using features provided by the contractive path through skip connections, and a model level that performs multilayer convolutions on outputs of the contractive path and expansive paths to produce the processed image and/or an image that is a difference between the processed image and the seismic data. A fraction of the seismic data may be selected for training the DUnet engine using an anchor method that automatically extends an initial seismic data subset, based on similarity measurements. A reweighting layer may further combine inputs received from layers of the DUnet model to preserve signal amplitude trend.

17 Claims, 11 Drawing Sheets

(51) Int. Cl.
*G06N 3/04* (2023.01)
*G06N 3/08* (2023.01)

(52) U.S. Cl.
CPC ....... *G06N 3/08* (2013.01); *G01V 2210/1293* (2013.01); *G01V 2210/56* (2013.01)

(58) Field of Classification Search
CPC .......... G06N 3/04; G06N 3/045; G06N 3/048; G06N 3/08; G06N 3/0455; G06N 3/0464; G06N 3/09
See application file for complete search history.

(56) References Cited

OTHER PUBLICATIONS

Zhang et al., "Bridging the Gap Between Anchor-based and Anchor-free Detection via Adaptive Training Sample Selection", Jun. 20, 2020, arXiv:1912.02424v4, pp. 1-10 (Year: 2020).*
Amundsen et al., "On seismic deghosting by spatial deconvolution", Dec. 2013, Geophysics, vol. 78, No. 6, pp. 267-271 (Year: 2013).*
Hongyu Sun et al., "Low frequency extrapolation with deep learning," SEG International Exposition and 88th Annual Meeting, 2018, SEG Technical Program Expanded Abstracts, pp. 2011-2015.
J. Messud et al., "Understanding how a deep neural network architecture choice can be related to a seismic processing task," First EAGE Digitalization Conference and Exhibition Apr. 6-9, 2020, Vienna, Austria, 4 pages.
M. Chambefort et al., "Building and understanding deep neural networks components for seismic processing: Lessons learned," 82nd EAGE Conference & Exhibition 2020, Jun. 8-11, 2020, Amsterdam, The Netherlands, Expanded Abstracts, 4 pages.
Nathaniel Chodosh et al., "When to use Convolutional Neural Networks for Inverse Problems," arXiv:2003.13820v1, Mar. 2020, 10 pages.
Olaf Ronneberger et al., "U-Net: Convolutional Networks for Biomedical Image Segmentation," Computer Science Department and BIOSS Centre for Biological Signalling Studies, University of Freiburg, Germany, arXiv:1505:04597v1, May 18, 2015, pp. 1-8.
Ping Wang et al., "Premigration deghosting for marine streamer data using a bootstrap approach in Tau-P domain," SEG Houston 2013 Annual Meeting, 2013, pp. 4221-4225.
Sara Mandelli et al., "Interpolation and Denoising of Seismic Data using Convolutional Neural Networks," arXiv: 1901.07927v4, Oct. 2019, pp. 1-27.
Tal Remez et al., "Deep Class Aware Denoising," arXiv:1701.01698, IEEE International Conference on Image Processing (ICIP), Feb. 2017, 23 pages.
Vardan Papyan et al., "Convolutional Neural Networks Analyzed via Convolutional Sparse Coding," Journal of Machine Learning Research, Oct. 2016, pp. 1-50, vol. 16.
Yuchen Jin et al., "Seismic Data Denoising By Deep Residual Networks," SEG International Exposition and 88th Annual Meeting, 2018, SEG Technical Program Expanded Abstracts, pp. 4593-4597.

* cited by examiner 540
505
h
502
510
530
520
500

FIGURE 13

SEISMIC DATA PROCESSING USING DUNET

TECHNICAL FIELD

Embodiments of the subject matter disclosed herein generally relate to methods and systems that perform seismic data processing using DUnet, which is a deep neural network architecture/engine converting an input image made of seismic data into an output image that is a processed (e.g., denoised) seismic data or image, representing the structure of the underground formation probed with seismic waves recorded as seismic data. More particularly, DUnet includes a contractive path (also known as "encoder"), an expansive path (also known as "decoder") and a model level connected to both the contractive and expansive paths.

DISCUSSION OF THE BACKGROUND

Seismic exploration uses seismic waves to probe underground formations. The seismic waves are injected into an underground formation and detected after traveling therethrough. Detected waves that are recorded as seismic data carry structural information about the materials they traveled through, the location of interfaces they crossed or were reflected off, attenuation they suffered, etc. However, besides the sought-after information-carrying signal, seismic data is affected also by noise, characteristics of the seismic wave's source and receiver, etc. Also, many seismic processing aspects involve removing "coherent" noise like multiple reflections. All of these intertwined aspects render seismic data processing highly complex.

Deep Learning (DL) is a very active field of research in seismic processing that aims, for example, to efficiently assess the output of seismic processing workflows (i.e., to predict the processed image from an input image using deep neural networks). The term "deep neural network," DNN, encompasses the use of multiple connected artificial neuron-based layers performing operations through which data flows from an input layer to an output layer without looping back (see, e.g., the textbook entitled "Deep Learning" by I. Goodfellow et al, published by MIT Press in 2016, ISBN: 0262035618). The DNN creates a map of virtual neurons and assigns random numerical values, or "weights," to connections between them. The weights and inputs are multiplied to yield an output. If the DNN did not accurately recognize a particular pattern, the weights are adjusted so that certain parameters become more influential until the optimized weights are determined.

Returning to using DNNs in seismic data processing, the 2019 article "Interpolation and Denoising of Seismic Data using Convolutional Neural Networks" by S. Mandelli et al. (made available to the public in arXiv:1901.07927v4) shows the use of Unet for denoising and reconstruction of missing data. In another example, the 2018 article "Seismic Data Denoising By Deep Residual Networks" by Jin et al. (published in *SEG Technical Program Expanded Abstracts,* pp. 4593-4597) uses a DNN for noise attenuation.

DL is useful, for example, in selecting the best of various existing workflows to increase turnaround or to obtain a processing guide. However, because of seismic processing's particularities, it is difficult to integrate DL methods in an industrial toolkit. Some notable challenges to such an integration are interpreting and quality-controlling the operations performed by DNNs together with determining which DNN architectures are best suited for each of the specific processing tasks. These issues are discussed in the 2018 article "Low frequency extrapolation with deep learning" by H. Sun and L. Demanet (published in *SEG Technical Program Expanded Abstracts,* pp. 2011-2015), the 2020 article "Building and understanding deep neural networks components for seismic processing: Lessons learned" by M. Chambefort and J. Messud (publish in 82nd *EAGE Conference & Exhibition, Expanded Abstracts*) and the 2020 article "Understanding how a deep neural network architecture choice can be related to a seismic processing task" by J. Messud and M. Chambefort (in *First EAGE Digitalization Conference and Exhibition* 2020).

The 2020 article by Chambefort and Messud has shown that Denet-inspired architectures (Denet being described, for example, in the 2017 article "Deep Class-aware Image denoising" by Remez et al, presented at *IEEE International Conference on Image Processing* (*ICIP*), made available to the public in arXiv:1701.01698) can naturally decompose an output model into complementary contributions. Using such contributions in an iterative deghosting process has been illustrated for receiver deghosting on a variable depth streamer.

The 2020 articles by Chambefort and Messud have also shown that Unet-inspired architectures (Unet being described, for example, in the 2015 article "Unet: Convolutional Networks for Biomedical Image Segmentation" by Ronneberger et al., made available to the public in arXiv: 1505:04597v1) can naturally "separate" event details from gross amplitude properties, and use both types of information in an efficient way with a concatenated "weighting"-like layer. It has been illustrated on a common image gather preconditioning, muting, and picking task that what a "small" (or low capacity) Unet learns can be interpreted in terms of kinematics and amplitude separation.

There is a need to continue developing deep learning architectures better suited to dealing with the complexities of seismic data processing. All the articles cited in this section are incorporated by references in their entirety.

SUMMARY

Methods and apparatuses according to various embodiments use DUnet architecture to denoise seismic data. The use of DUnet yields a better output quality with a better interpretability then conventional DNN architectures.

According to an embodiment there is a seismic exploration method that includes obtaining seismic data acquired over the underground formation and producing a processed image of the underground formation from the seismic data using a DUnet engine. The processed image enables to identify presence of targeted resources in the underground formation. The DUnet engine includes: (1) a contractive path that performs multilayer convolutions and contraction to extract a code from the seismic data input to the DUnet engine, (2) an expansive path configured to perform multilayer convolutions and expansion of the code, using features provided by the contractive path through skip connections, and (3) a model level that performs multilayer convolutions on outputs of the contractive path and expansive paths to produce the processed image (e.g., a denoised image) and/or an image that is the difference between the processed image and the seismic data (e.g., the noise).

According to another embodiment there is a seismic data processing apparatus for exploring an underground formation. The apparatus has an interface configured to obtain seismic data acquired over the underground formation and a data processing unit. The data processing unit is configured to produce a processed image of the underground formation from the seismic data using a DUnet engine, the processed image enabling to identify presence of targeted resources. The DUnet engine includes: (1) a contractive path that performs multilayer convolutions and contraction to extract a code from the seismic data input to the DUnet engine, (2) an expansive path configured to perform multilayer convolutions and expansion of the code, using features provided by the contractive path through skip connections, and (3) a model level that performs multilayer convolutions on outputs of the contractive path and expansive paths to produce the processed image (e.g., a denoised image) and/or an image that is a difference between the processed image and the seismic data (e.g., the noise).

According to yet another embodiment there is a computer readable recording medium storing executable codes that when executed by a computer make the computer perform a seismic exploration method. The method includes obtaining seismic data acquired over the underground formation and producing a processed image of the underground formation from the seismic data using a DUnet engine. The processed image enables to identify presence of targeted resources in the underground formation. The DUnet engine includes: (1) a contractive path that performs multilayer convolutions and contraction to extract a code from the seismic data input to the DUnet engine, (2) an expansive path configured to perform multilayer convolutions and expansion of the code, using features provided by the contractive path through skip connections, and (3) a model level that performs multilayer convolutions on outputs of the contractive path and expansive paths to produce the processed image (e.g., a denoised image) and/or an image that is the difference between the processed image and the seismic data (e.g., the noise).

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 13 is an illustration of reweighting layer decomposition; and

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

The following embodiments employ a deep neural network (DNN) architecture (or engine) called DUnet that is configured to generate a structural image of an explored underground formation from a seismic dataset acquired over the underground formation. Note that the terms "architecture" and "engine" are interchangeably referring to an operative arrangement of functional elements executed on a hardware support. The DNN-type of architecture/engines discussed here (i.e., Unet Denet and DUnet) are architectures in the sense of arrangements of functional elements and engines in the sense that they produce outputs when fed inputs. In particular, as further discussed, in the discussed embodiments DUnet engine is used to output processed images of the underground formation that enable locating targeted resources (such as oil and gas, minerals/mining and geothermal resources). DUnet includes a contractive path (i.e., encoder), an expansive path (i.e., decoder) and a model level connected to both the contractive and expansive paths.

Figure 1:
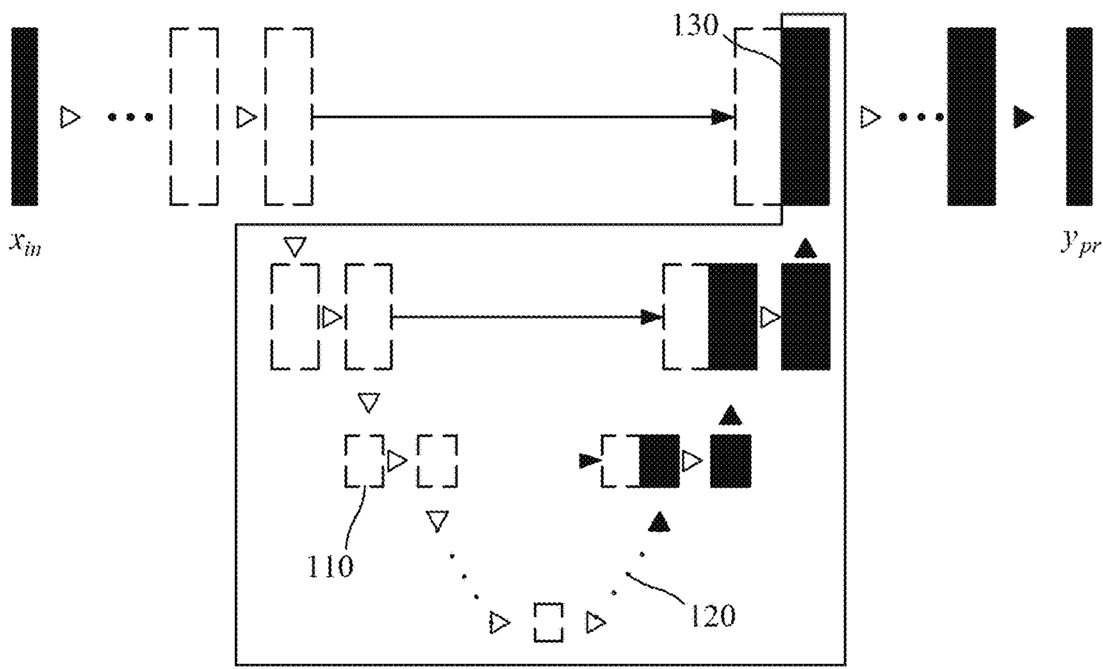
FIG. 1 illustrates a Unet architecture.

To better explain the particularities of DUnet, conventional Unet and Denet architectures are first introduced. Unet architecture, exemplarily illustrated in FIG. 1, is a convolutional neural network that receives an input image $x_{in}$, and has a contracting path 110 and an expansive path 120. Repeated convolutions with contractions (symbolized as down-pointing triangles) followed by a rectified linear unit (ReLU, symbolized by right-pointing triangles) and a max-pooling operation performed along the contracting path 110 reduce spatial information while increasing feature information. Then, repeated up-convolutions (i.e., convolution with expansion symbolized by the up-pointing black triangles) and concatenations with high-resolution features (dashed horizontal lines) are performed along the expansive path 120. The results of each processing phase are combined by "weighting" layer 130 to yield the output image $y_{pr}$.

Figure 2:
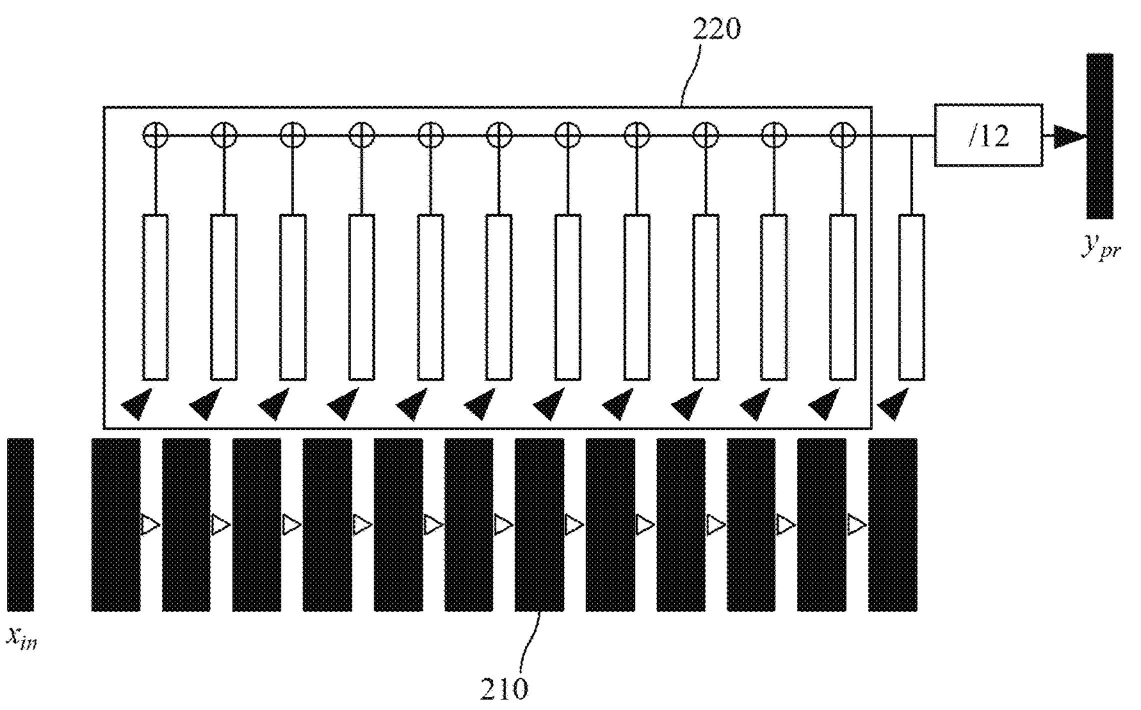
FIG. 2 illustrated a Denet architecture.

As described in the 2017 article by Remez, Denet is an image denoising architecture/engine that performs image processing (or denoising) in a fully convolutional manner. The input $x_{in}$ is a noisy image and the output, $y_{pr}$, is an estimate of the processed image. As illustrated in FIG. 2, the input image is decomposed by a convolutional DNN 210, connected to additional convolutional layers with Tanh activation functions (symbolized by the tilted up-right-pointing black triangles) whose outputs are averaged to yield the estimate of the processed image.

Figure 3:
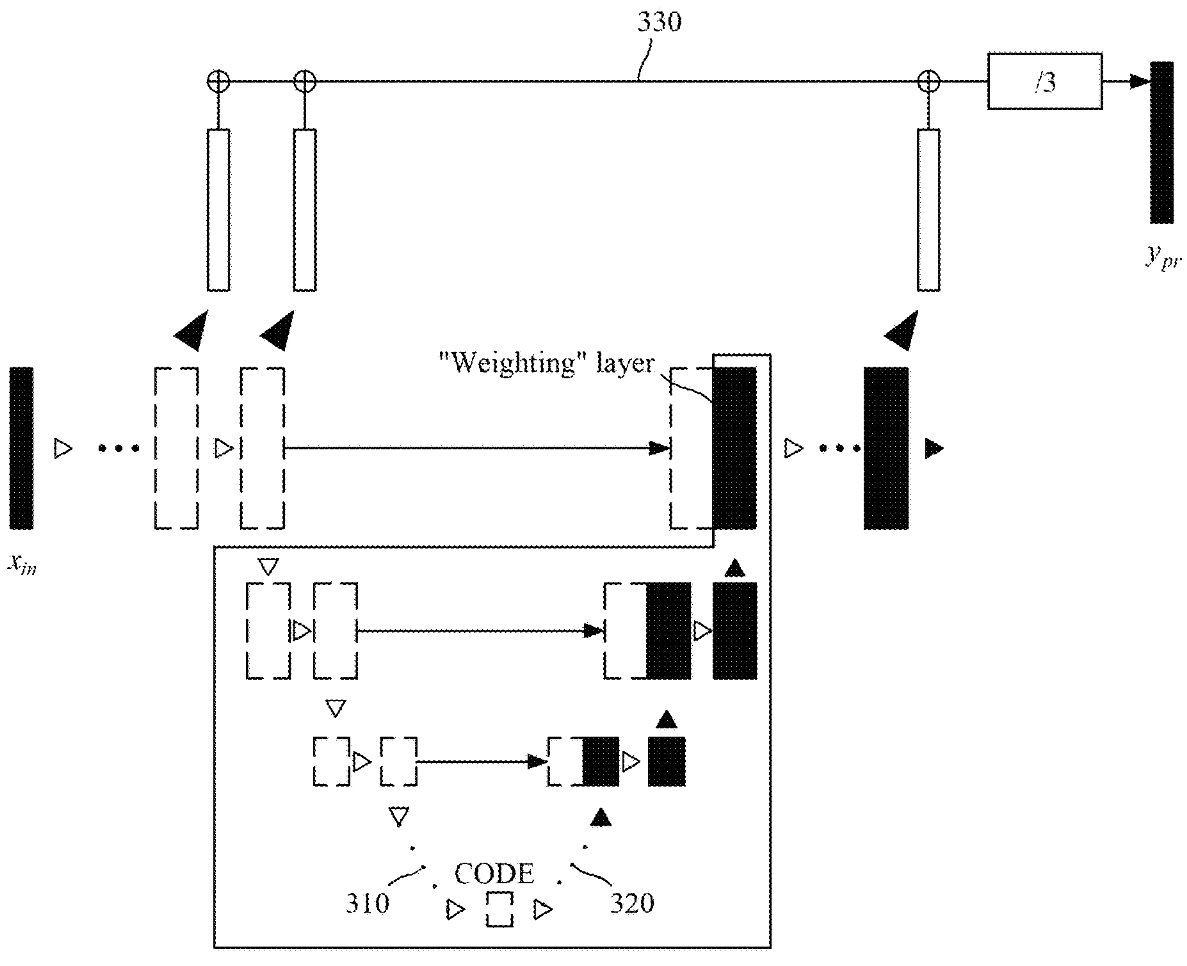
FIG. 3 illustrates a DUnet architecture according to an embodiment.

The following embodiments use a DNN architecture/engine, DUnet, improving on both Unet and Denet. Similar to Unet and Denet, DUnet has an image as input and it outputs a processed image, while providing a better output quality and/or better interpretability than two conventional DNN-based architectures mentioned above. DUnet, which is illustrated in FIG. 3, is a convolutional-based architecture that combines the advantages of Unet and Denet. DUnet has a contractive path 310, an expansive path 320, with auxiliary connections named weighting layer realized by concatenation with the encoder, and a model level (the three layers on the top) 330 connected to the contractive path and the expansive path. DUnet uses ReLU function as internal activation for the encoder and decoder and Tanh inside the model level as the output activation function. The model level combines the feature information into an output image with better output quality than Denet and better interpretability than Unet.

DUnet is usable for various seismic processing tasks that have an image as input and yield a processed image as output. DUnet enhances exiting approaches, for example, by implementing the best of existing algorithms, increasing turnaround or providing a processing guide. DUnet can be used in several processing tasks (including but not limited to the simultaneous source and receiver deghosting task that is discussed in more detail later) and possibly beyond image denoising or seismic processing.

DUnet gathers the advantages of both Denet (i.e., output model complementary decomposition for quality control and possible interpretation) and Unet (weighting layer) while improving the results. Consider a processing algorithm related to solving the following problem:

$$\min_{y_{out}} \|W_1^t W_2^t y_{out} - x_{in}\|_2^2 + \|b \odot W_2^t y_{out}\|_1 \tag{1}$$

where $x_{in}$ represents an input data vector and $y_{out}$ a processed output data vector often of the same size as the input data vector, $$W_1^t \text{ and } W_2^t$$

are known matrices parameterized by prior physical information (t denotes the adjoint).

$$W_2^t$$

represents a transformation of the data into a sparse domain, hence the L1 sparsity constraint in the second term of equation (1) and ⊙ indicates an element-wise multiplication. This constraint brings non-linearity and is parameterized by a positive weight vector b, usually defined through user tunings. Deghosting algorithms (Wang et al., 2013), for instance, may be formulated as a problem of the form in equation (1) with $x_{in}$ being ghosted data, $y_{out}$ the corresponding deghosted data, $$W_2^t$$

the Radon transform (parameterized by user-defined information like the range of slopes to scan), and $$W_1^t$$

the "ghosting-inverse Radon transform" parameterized by deghosting physics and priors (water velocity, water-air reflection coefficient, streamer depth). Let's assume that $$W_1^t \text{ and } W_2^t$$

are convolution-based operators, which is true for deghosting.

The 2017 article "Convolutional Neural Networks Analyzed via Convolutional Sparse Coding" by Papyan et al. (published in *Journal of Machine Learning Research,* vol. 18, pp. 1-52, and incorporated herein by reference in its entirety) solves equation (1) using the Iterative Soft Thresholding (IST) algorithm, which allows implementation in a DNN-like parameterization. The first IST iteration takes a neural network form with a ReLU activation:

$$y_{out}^{(iter1)} = W_2 ReLU(W_1 x_{in} - b) \tag{2}$$

which is valid only when $W_1\, x_{in} \geq b$. This positivity restriction is usually unrealistic for seismic application, as the data is signed and oscillatory. However, although not considered up to now, this restriction can be removed by applying the "2-sided ReLU" activation instead of regular ReLU in equation (2):

$$ReLU(W_1 x_{in} - b) \rightarrow ReLU(W_1 x_{in} - b) - ReLU(-W_1 x_{in} - b).$$

As this 2-sided ReLU is simply by a combination of two ReLUs, the ReLU notation is maintained in the following equations. The appearance of ReLU in equation (2) is related to the L1 sparsity constraint, which thresholds small values $\in [-b, 0]$.

An approximate solution of equation (1) thus takes the shallow neural network form of equation (2). However, as discussed above, $W_1$, $W_2$ and b are for now considered as known. The goal of DL is to learn an efficient representation of these operators directly from the data, which is a highly non-linear problem, especially as the priors (i.e., the contents of $W_1$, $W_2$) often vary with the data. To provide flexibility and ease training, the large "physical" convolution kernel represented by $W_2^t W_1^t$ is decomposed into many (N) smaller possibly "abstract" convolution kernels represented by matrices $V_i^t$:

$$W_1^t W_2^t y_{out} \approx V_1^t V_2^t y_{out} \tag{3}$$

the $V_1^t$ transforms producing sparse domains. Equation (1) then becomes $$\min_{y_{pr}, g_{N-1}, \ldots, g_1} \|V_N^t y_{pr} - g_{N-1}\|_2^2 + \|V_{N-1}^t g_{N-1} - B g_{N-1}\|_2^2 + \ldots + \|V_1^t g_1 - x_{in}\|_2^2 + \|b_{N-1} \odot g_{N-1}\|_1 + \|b_{N-2} \odot g_{N-2}\|_1 + \ldots + \|b_1 \odot g_1\|_1 \tag{4}$$

with $$y_{pr} \approx V_N g_{N-1},\ g_{N-1} \approx ReLU(V_N - 1 g_{N-2} - b_{N-1}), \ldots,\ g_1 \approx ReLU(V_1 x_{in} - b_1). \tag{5}$$

Equations (4) and (5) have a convolutional DNN form with ReLU internal activations. Note that an alternative embodiment may use a Tanh output activation (i.e., $y_{pr} \approx \text{Tanh}(V_N\ g_{N-1})$) by adding a soft clipping constraint $\Omega(y_{pr})$ in equation (5). The model $\{V_N, \ldots, V_1, b_{N-1}, \ldots, b_1\}$ must be trained so that $y_{pr}$ is the closest from the output rout of a standard processing described by equation (1).

The above equations proved that a standard convolutional DNN with ReLU internal activations and possibly a Tanh output activation represent a good "first order" parameterization of processing problems when the hypotheses above are satisfied, especially the kernel splitting of equation (3). The kernel splitting brings efficiency and flexibility to DNNs, the main advantage of considering them for processing tasks. DUnet enables the use of ReLU internal activations to handle the non-linearity related to the sparsity constraints in the conventional problem (equation (1)) but also to the variation within the survey of priors like the variable cable depth. The improvement is obvious compared to using identity activation (meaning that no sparsity constraint is considered nor variation of priors like the cable depth).

However, equation (5) represents only a first order (or IST iteration) result. In practice, more complex convolution-based architectures than the one defined through equation (5) often give better results than a standard convolutional DNN.

Unet, Denet and DUnet architectures models into this mathematical framework is now discussed. Unet architecture illustrated in FIG. 1 uses ReLU activations for internal layers and a Tanh activation for the output layer that is a concatenation layer (called "weighting" layer) in addition to a "standard" convolutional DNN. The above considerations can easily be adapted to include an arbitrary layer concatenation in the decomposition of equation (4). However, relating this layer to the complex Unet weighting layer parameterization, obtained from "contracting" and "expanding" convolutional-based paths, does not seem straightforward and it is still missing to fully justify the use of Unet. Nevertheless, the weighting layer gives a lot of flexibility: the feature maps contractions, expansions and concatenations allowing, among others, to "separate" and recombine events, details, and gross amplitude information thereby to learn an efficient layer for a given task. This contributes to explaining why Unet (with standard capacity) encountered many successes in seismic processing.

Denet architecture illustrated in FIG. 2 uses ReLU activations for internal layers 210, and Tanh activations for the 12 "model" layers (the ones whose quality may be assessed). The model layers are averaged (as suggested by the "/12" box), producing a processed output $y_{pr}$. Together with the data normalization, Tanh "regularization" of the model layers maintains output at the same magnitude as input and thus helps in learning complementary information. The above considerations can be adapted to justify Denet architecture by adding model layers terms to the decomposition in equation (3) and imposing in equation (4) that $y_{pr}$ equals the average of the model layers. The modification of equation (3) gives more flexibility (or capacity) to Denet compared to a standard convolutional DNN.

The DUnet architecture illustrated in FIG. 3 gathers the complementary advantages of Denet (introduction of a model decomposed into complementary contributions) and Unet (weighting layer, with standard capacity). The model level is connected only to three most complete convolutional layers to have the same size as the output, not to the weighting layer, as the "weight" acts in combination with a convolutional layer. The above mathematical considerations can naturally be applied to the DUnet architecture (apart from the weighting layer's specific parameterization, still missing). DUnet is capable of producing better results than Denet on the simultaneous source and receiver deghosting task, almost completely removing primary leakage.

DUnet engine in FIG. 3 may be used to perform a deghosting task according to the technique described in the 2013 article "Premigration deghosting for marine streamer data using a bootstrap approach in tau-p domain" by Wang et al. (published in *SEG Technical Program Expanded Abstracts,* pp. 4221-4225, and incorporated herein by reference in its entirety). According to this deghosting technique, first mirror data (relative to water surface) is generated based on the seismic data recorded by receivers towed underwater above the explored formation (which is under the seafloor). The seismic data and the mirror data are then both transformed into a Tau-P domain of the seismic data, divided into a plurality of data windows. Deghosted data is generated using a ghost delay time for each data window, so that the deghosted data has a spectrum substantially free of frequency depletions occurring in the seismic data due to receiver-side ghosts. The image of the formation under the seafloor is produced based on the deghosted data, the image enabling to evaluate presence and location of targeted resource reservoirs.

Figure 4:
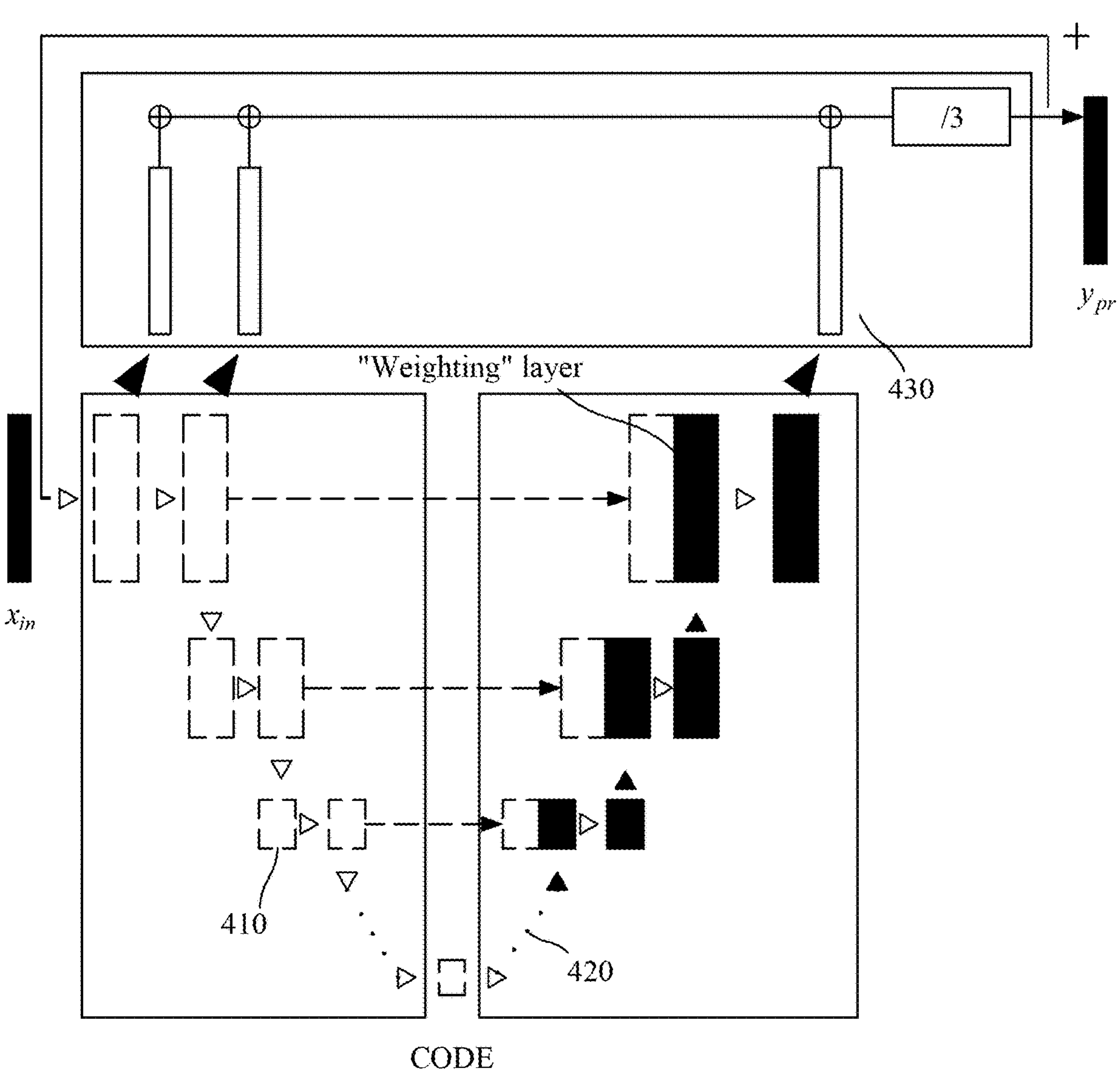
FIG. 4 illustrates a DUnet architecture according to another embodiment.
Figure 5:
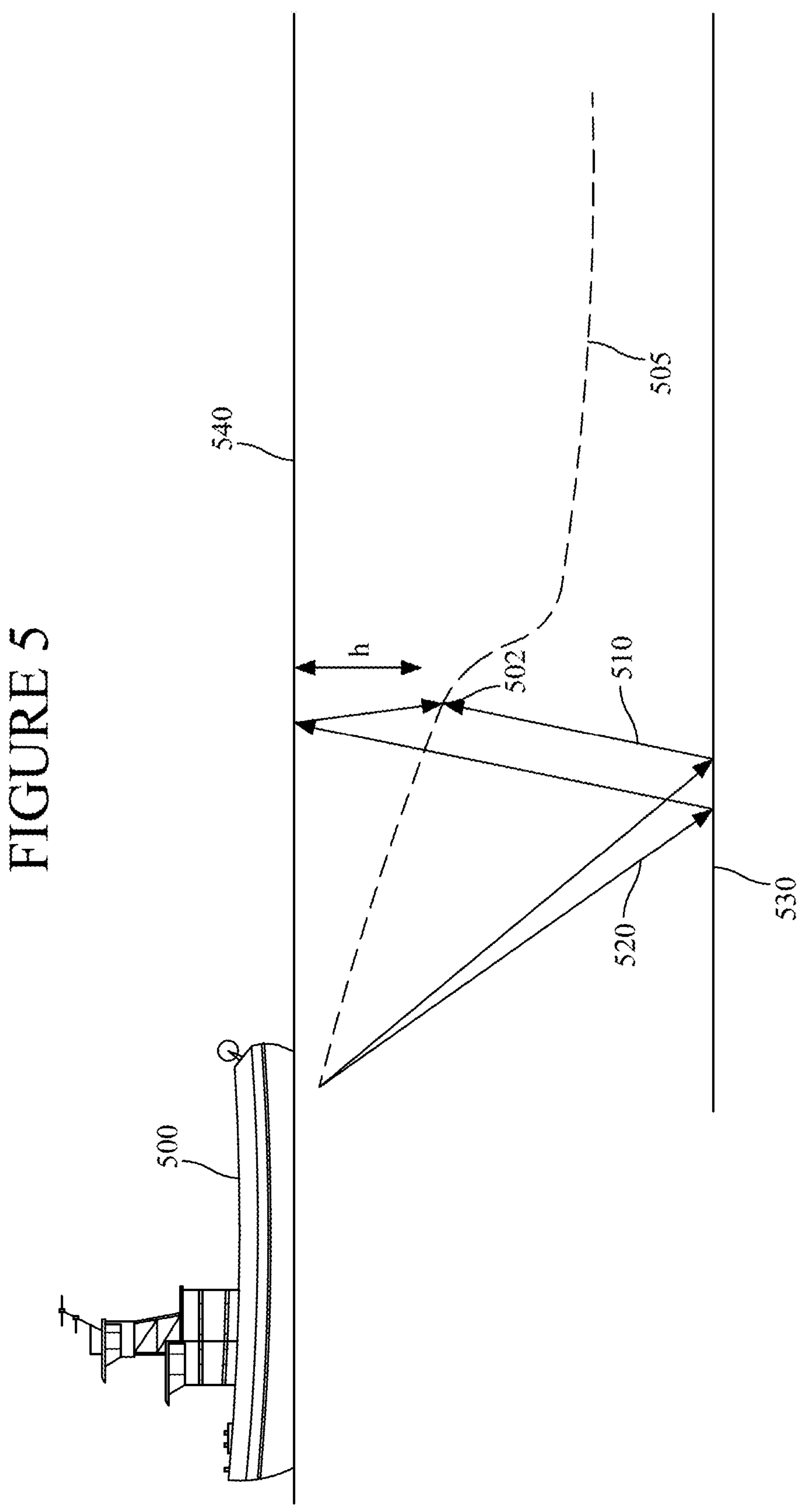
FIG. 5 illustrates marine seismic data acquisition.
Figure 6:
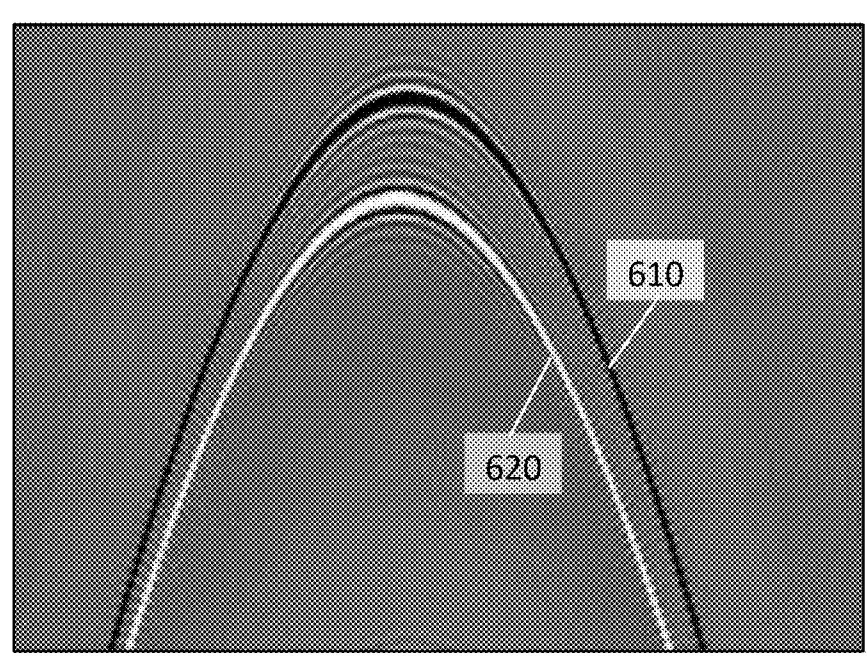
FIG. 6 is a graph illustrating primary and ghost concept associated with the data acquisition in FIG. 5.

While the DUnet engine in FIG. 3 outputs a primary model (i.e., an estimate without ghosts), by adding the input image as illustrated in FIG. 4, the DUnet engine may output a ghost model (i.e., an estimate of the ghosts only). For a brief explanation of primaries and ghosts, FIG. 5 illustrates a vessel 500 towing a source (not shown) that emits seismic waves 510, 520 reflected off the same bottom surface 530 (seafloor or an underground reflector). The reflected waves are detected by a same receiver 502 of a variable depth streamer 505 also towed by the vessel. Seismic wave 510 travels directly from the bottom surface 530 to the receiver 502, while seismic wave 520 is reflected by the water surface 540 (that has an R=−1 water-air reflectivity) before reaching the receiver 502. Therefore, seismic waves like 510 are known as primaries and arrive earlier to the receivers than seismic waves like 520 known as ghost. Since the ghosts carry the same information as the primaries from the point of view of the structural information, one step in seismic data processing is to separate and eliminate the ghosts (or the primaries) to obtain a clearer structural image of the underground formation. FIG. 6 is a graph representing time versus offset with detected amplitude as nuances of gray (i.e., distance from the source to the receiver) showing the earlier arriving primaries 610 relative to the ghosts 620 (note that different colors also indicate polarity change when reflected at the water surface). Delay between the arrival of the primary and the ghost depends on the depth (h in FIG. 5) at which the receiver is towed.

Returning now to using DNNs engines, two phases are necessary: a training phase and an inference (application) phase. Training is performed in shot domain but, because preventing primary damage is as difficult for DNNs as removing ghosts, the quality control is performed in normal move-out (NMO) stack domain to focus on primary preservation. Using DUnet almost completely prevents the primary damage.

An input shot $x_{in}$ and a reference image resulting from this input shot by processing via another flow $y_{ref}$ are the training data. The input shot is subjected to convolution and contraction along the contractive path 310 to extract features and yield a code corresponding to the input shot. Then, along the expansive path 320, this code is subjected to convolution and expansion being also concatenated with features extracted along the contractive path 310 (see the dashed lines there-between). In the modeling level 330, the highest level of features of encoder and decoder are averaged to generate the output $y_{pr}$. During the inference (application) phase, the DNN engine could be applied on data that has never been used in training. The data should be in same domain as training data.

The output $y_{pr}$ is compared to $y_{ref}$ to perform an Adam optimization. Adam optimization updates encoder (i.e., contractive path), decoder (expansive path), and modeling level parameters $\omega_t$ from one iteration t to a next iteration t+1 in the following manner:

$$\omega_{t+1} = \omega_t + \Delta\omega_t \tag{6}$$

$$\Delta\omega_t = -\eta\frac{v_t}{\sqrt{s_t + \epsilon}} * g_t$$

$$s_t = \beta_2 * s_{t-1} - (1 - \beta_2) * g_t^2$$

$$v_t = \beta_1 * v_{t-1} - (1 - \beta_1) * g_t$$

where $\Delta\omega_t$ is the change in the parameter $\Omega_t$, $\eta$ is the initial learning rate, $g_t$ is the gradient of the parameter at t, $v_t$ is exponential average of gradients along $\omega$, $s_t$ is exponential average of squares of gradients along $\omega$, and $\beta_1$, $\beta_2$ are hyperparameters. Note that another index, e.g., j indicating different parameters has been omitted for the sake of brevity.

Figure 7:
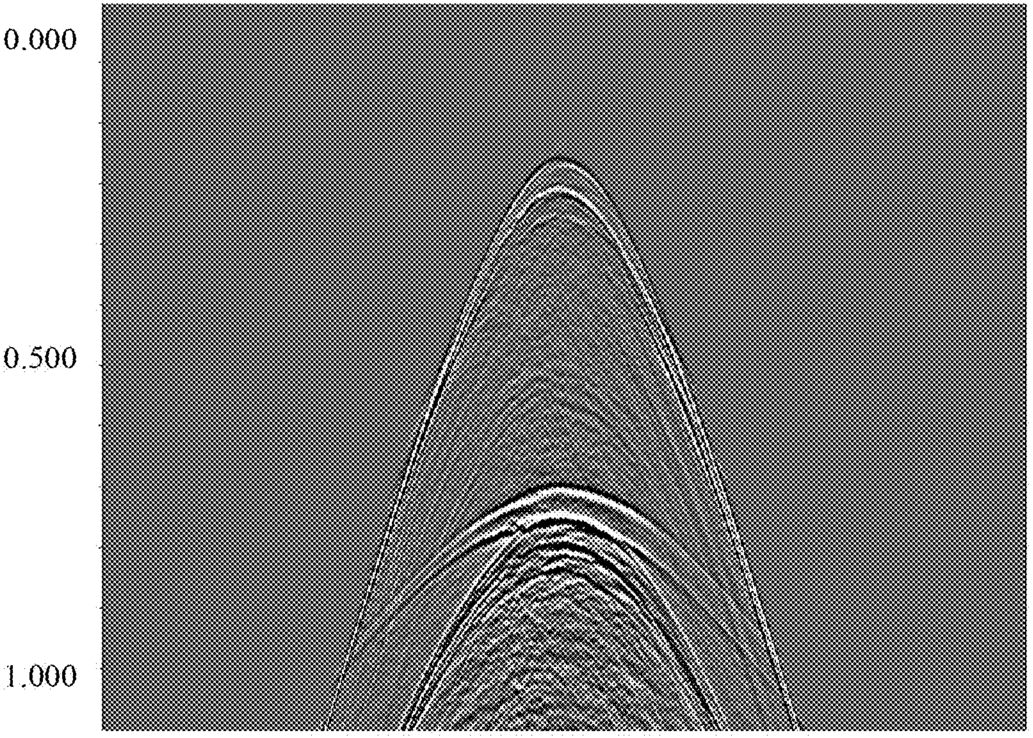
FIG. 7 is a graph representing an input shot.
Figure 8:
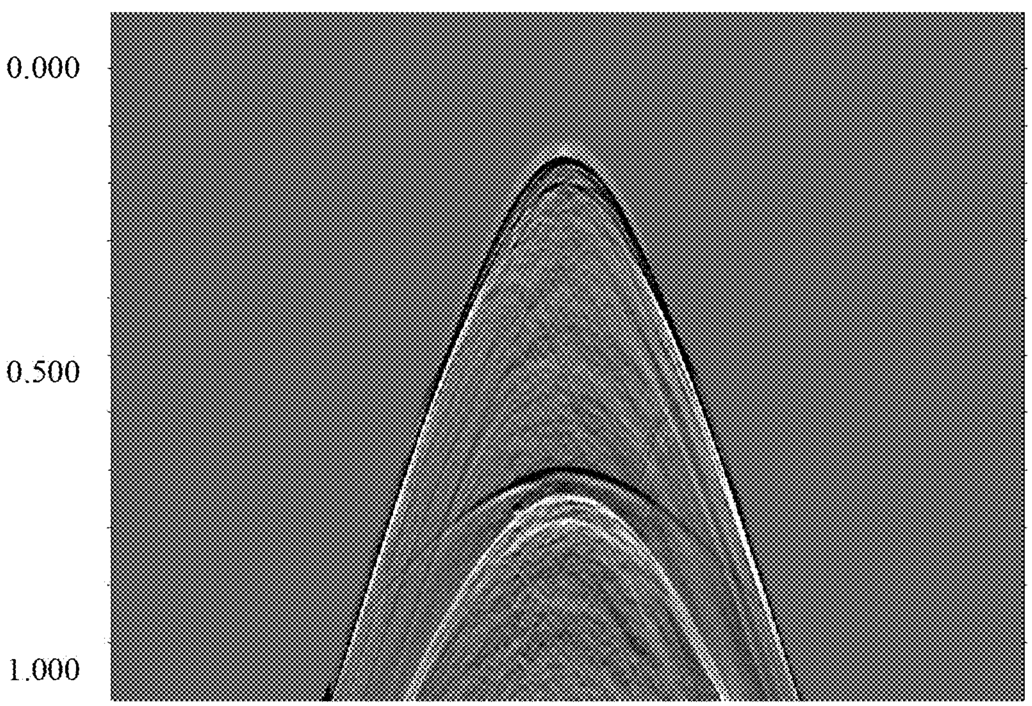
FIG. 8 is a graph representing the reference (deghosted) shot.

Consider now a comparison of the efficiency of seismic processing using trained Unet, Denet and DUnet engines in deghosting the same input shot illustrated in FIG. 7, where x-axis is offset (1-564 receivers on a variable depth streamer at 25 m interval from one another), y-axis is arrival time and the nuances of gray represent amplitude of detected seismic wave. FIG. 8 illustrates a reference shot, that is the input shot deghosted using another highly performant but time and man-power consuming processing flow.

Figure 9:
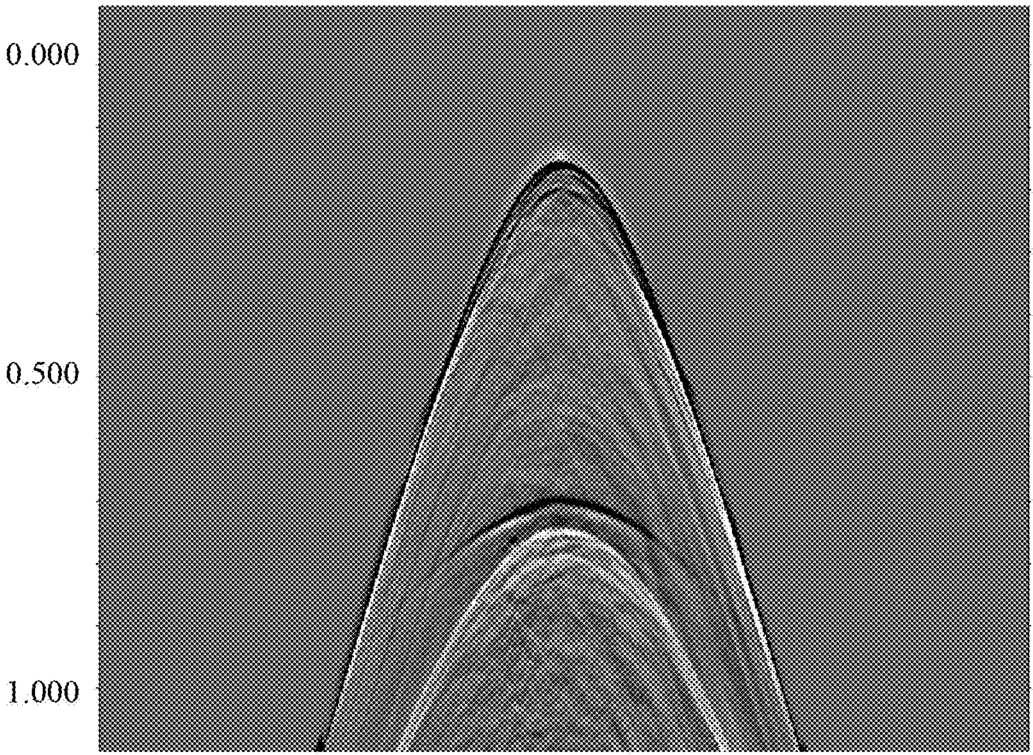
FIG. 9 is a graph representing the result of deghosting of the shot in FIG. 7 using the DUnet engine.
Figure 10:
FIG. 10 is the difference between the structural image obtained using the DUnet engine and reference.
Figure 11:
FIG. 11 is the difference between the structural image obtained using the Denet engine and reference.

FIG. 9 represents the result of deghosting the shot in FIG. 7 using the DUnet engine. Training and prediction are performed in shot domain but, because preventing primary damage is as difficult for DNNs as removing ghosts, we did additional QC in normal move-out (NMO) stack domain to focus on primary preservation. FIGS. 10 and 11 are differences in stack domain obtained through using DUnet engine and Denet engine respectively and the reference stack (Unet engine performs somewhat similar with DUnet engine). Undesirable primary signal leakage is visible in area 1110 in the latter.

Note that deghosting is an exemplary non-limiting application of DUnet engine and this architecture can also be applied to other seismic processing steps, especially all denoising steps, and different domains.

Figure 12:
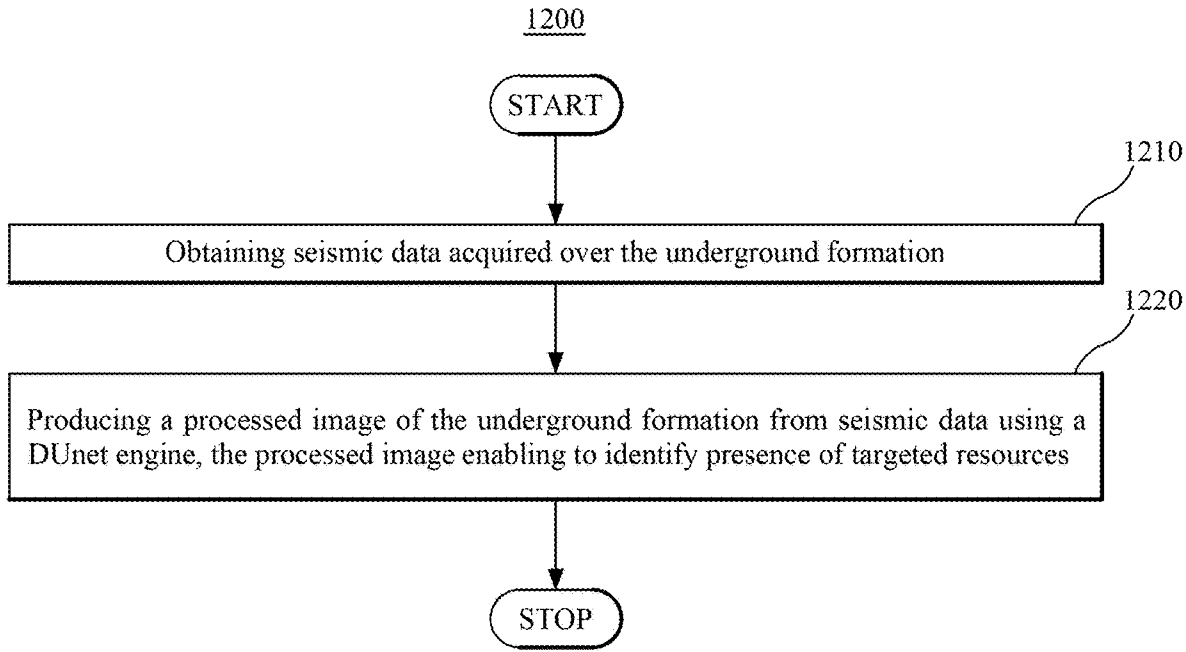
FIG. 12 is a flowchart of a method according to an embodiment.

With the above explanations, a flowchart of a seismic exploration method 1200 of an underground formation according to an embodiment is illustrated in FIG. 12. Method includes obtaining a seismic data set acquired over the underground formation at 1210. Method 1200 further includes producing a processed image of the underground formation from the seismic dataset using a DUnet engine, the processed image enabling to identify presence of targeted resources. Here, the DUnet engine consists of a contractive path (also known as "encoder", e.g., 310) that performs multilayer convolution and contraction to extract a code from the seismic data input to the DUnet, an expansive path (also known as "decoder", e.g., 320) connected to the contractive path and configured to perform multilayer convolution and expansion of the code, using features provided by the contractive path through skip connections, and a model level (e.g., 330) connected to the contractive path and to the expansive path and and configured that is a difference between the processed image and the seismic data (e.g., the noise).

The method may also include training the DUnet engine using any kind of training data, a fraction of the seismic data (i.e., data from the current survey) or other seismic data (i.e., another survey) or synthetic seismic data. Intelligently selecting a training subset with minimal human intervention is one of the challenges to be overcome in order to build confidence in adopting DNNs routinely in seismic processing workflows. If the training set is too small or insufficiently sampled, it will not capture the variability of the full data, leading to poor result. Conversely, although a large training set ensuring a good quality of the DNN results may come at a prohibitive cost of the training process. One approach to training data selection uses a prior attribute (e.g., geological horizons) clustering method. In this approach, the distance to centroids is used in the clustering method without any constraints on the location of the selected data. Another approach (known as "anchor method") starts from an initial training set, and then scans through the full dataset using a similarity measure to identify additional training samples in order to augment the initial training set. Both approaches allow irregularly sampled selection, in order to better capture the data variability.

The anchor method can be easily integrated in a processing sequence. It starts with an initial dataset (hereafter called 'anchor') that may be defined according to the acquisition set-up (e.g., sail-lines, cross-spread) or even randomly if the processing flow allows it. For example, if deghosting is applied in a sail-line manner, regularly spaced sail-lines are used. A pairwise similarity measurement is then calculated between all input shot points and each "anchor" shot point. This similarity measurement may be an Lp distance, a Wasserstein distance or any other similarity metric. The L2 distance was found to work well for this purpose. These calculations create a similarity map that enable identifying outlier areas with large values similarity measurements indicating a substantial difference relative to the anchor dataset. The anchor dataset is then expanded to include samples from these outlier areas.

In one embodiment, the Dunet further includes a reweighting layer that takes as an input the DUnet model level layers and combines them using spatial and/or temporarily smooth coefficients and additional multilayer convolutions that preserve signal amplitude trend. The reweighting layer is a neural network layer that improves general robustness to data amplitude trends. This layer improves the results in the case of a complex workflow that involves an amplitude trend change.

Consider amplitude scaling as the computation and application of relatively smooth local weights denoted by $\theta_{t,o}(x)$:

$$y_{t}, = \theta_{t,o}(x)x_{t,o} \tag{7}$$

where x represents an input data and y the corresponding output (or amplitude processed) data, both indexed by t,o, for instance time and offset in the case of shot data. Standard amplitude scaling examples are (1) a windowed automatic gain control (AGC) amplitude equalization or (2) a so-called spherical divergence correction. The amplitude scaling in (7)

is not valuable as such in a neural network context but there is a more efficient neural network layer for such a task interesting in the larger quest of robustness to amplitudes. A neural network layer is sought to concentrate on the amplitude scaling weights $\theta_{t,o}(x)$ rather than directly on the output $\theta_{t,o}(x)\ x_{t,o}$. A usual structure is the (1x1) locally connected (LC) layer, $y_{t,o}=\theta_{t,o}^{(LC)}x_{t,o}$. But this layer lacks the x-dependency in $\theta_{t,o}^{(LC)}$ of (7), making it impossible to reproduce an amplitude correction that depends on the data, i.e. that adapts to different event locations in the data (due to geology, water bottom (WB) location in the marine acquisition case . . . ). This would result in a poor amplitude scaling averaged over the training dataset. However, the locally connected layer may be refined by introducing an x-dependency together with a neural network parameterization in $\theta_{t,o}$. A convolutional-based neural network with pertinent parameterization allow one to efficiently extract a smooth amplitude trend changes from the input data x:

$$\theta_{t,o}^{(conv)}(x)=\sum_f \alpha_f \omega_{t,o,f}(x) \tag{8}$$

where $\omega_{t,o,f}(x)$ represents a convolutional layer with a certain number of feature maps indexed by f:

$$\omega_{t,o,f}(x)=\sigma\left(\sum_{i,j}\omega_{i,j,f}x_{t+i,o+j}+b_{i,j,f}\right) \tag{9}$$

with σ representing a chosen activation, and w and b the trained convolutional kernels and biases, respectively (see, e.g. Goodfellow et al., 2016). Then, scaling by trained scalar coefficients $\alpha_f$ and summing over feature maps reduces the feature maps dimension and produces the output. However, such a parameterization is still not sufficient to efficiently reproduce, for instance, AGC. Indeed, the gross amplitude trend of x tends to strongly remain in $\theta_{t,o}^{(conv)}(x)$ for a reasonable number of feature maps, whereas the AGC produces a gross amplitude trend of 1/x.

Adding a smooth t,o dependency to $\alpha_{t,o,f}$ (in equation 10 below) consistent with the usual "textures" of the amplitude trend changes weight and overcomes the above-noticed problem giving robustness with respect to event location variation.

$$\theta_{t,o}^{(rew)}(x)=\sum_f \alpha_{t,o,f}\omega_{t,o,f}(x) \tag{10}$$

Each $\alpha_{t,f}$ can be seen as an amplitude weight local component providing the flexibility needed for learning amplitude corrections. The DUnet engine may further include an additional neural network layer named "reweighting layer", that combines DUnet model level layers using spatial and/or temporarily smooth coefficients and additional multilayer convolutions to preserve signal amplitude trend.

The reweighting layer handles amplitude scaling effectively because on one hand $\alpha_{t,o,f}$ (the "weight maps") are representative of local amplitude trends with some spatial information indexed by f (feature maps), and, on the other hand, $\omega_{t,o,f}(x)$ ("selection maps") allow to select and combine the weight maps $\alpha_{t,o,f}$ to reproduce the best amplitude trend correction.

Adding an input channel dependency to $x_{t,o,c}$ and $\omega_{t,o,f,c}(x)$, denoted by c, allows the network to take into account inputs with multiple channels. The channel dependency is then added to the selection maps, the $\omega_{t,o,f,c}(x)$ representing a convolutional layer with f*c output channels:

$$\omega_{t,o,f,c}(x)=\sigma\left(\sum_{i,j,m}\omega_{i,j,f,c}x_{t+i,o+j,m}+b_{i,j,f,c}\right) \tag{11}$$

$\theta_{t,o,c}^{(rew)}(x)$ becomes dependent on c and the output is recovered by $$y_{t},\ =\sum_c \theta_{t,o,c}(x)x_{t,o,c} \tag{12}$$

Figure 13:
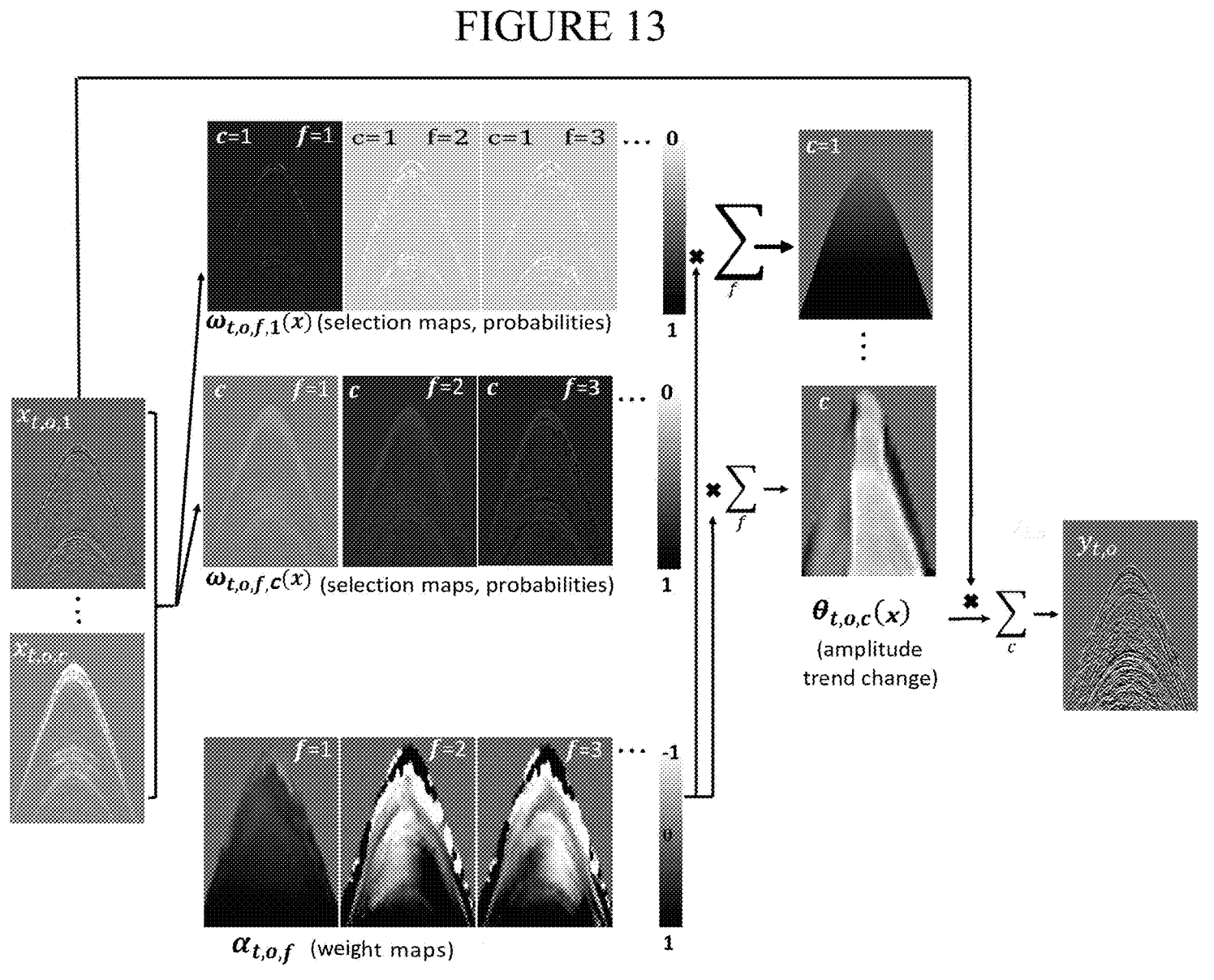

FIG. 13 provides an illustration of this decomposition.

When the DUnet engine include an additional reweighting layer, the input of the reweighting layer consists in the DUnet model level layers treated as a channel dependency c.

Figure 14:
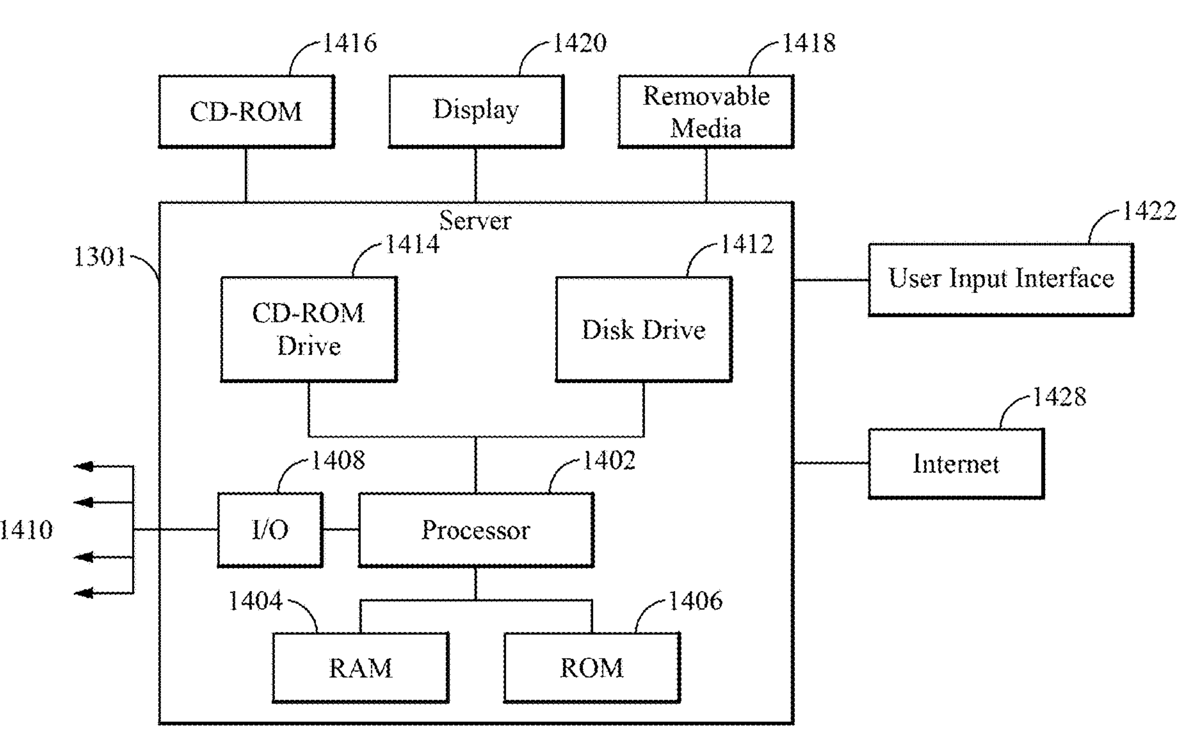
FIG. 14 a schematic diagram of a data processing apparatus according to an embodiment.

The above-discussed methods may be implemented in a computing device 1400 as illustrated in FIG. 14. Hardware, firmware, software or a combination thereof may be used to perform the various steps and operations described herein.

Exemplary computing device 1400 suitable for performing the activities described in the exemplary embodiments may include a server 1401. Server 1401 may include a central processor (CPU or GPU) 1402 coupled to a random access memory (RAM) 1404 and to a read-only memory (ROM) 1406. ROM 1406 may also be other types of storage media to store programs, such as programmable ROM (PROM), erasable PROM (EPROM), etc. Processor 1402 may communicate with other internal and external components through input/output (I/O) circuitry 1408 and bussing 1410 to provide control signals and the like. Processor 1402 carries out a variety of functions as are known in the art, as dictated by software and/or firmware instructions.

Server 1401 may also include one or more data storage devices, including hard drives 1412, CD-ROM drives 1414 and other hardware capable of reading and/or storing information, such as DVD, etc. In one embodiment, software for carrying out the above-discussed steps may be stored and distributed on a CD-ROM or DVD 1416, a USB storage device 1418 or other form of media capable of portably storing information. These storage media may be inserted into, and read by, devices such as CD-ROM drive 1414, disk drive 1412, etc. Server 1401 may be coupled to a display 1420, which may be any type of known display or presentation screen, such as LCD, plasma display, cathode ray tube (CRT), etc. A user input interface 1422 is provided, including one or more user interface mechanisms such as a mouse, keyboard, microphone, touchpad, touch screen, voice-recognition system, etc.

Server 1401 may be coupled to other devices, such as sources, detectors, etc. The server may be part of a larger network configuration as in a global area network such as the Internet 1428, which allows ultimate connection to various computing devices.

The embodiments described in this section provide methods and apparatuses that use DUnet a DNN type of architecture for seismic data processing. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A seismic exploration method for denoising and/or deghosting seismic data, the method comprising:

obtaining seismic data acquired over an underground formation; and generating a denoised image of the underground formation by reconstructing seismic signals from a noisy input domain of the seismic data using a DUnet engine, wherein the DUnet engine reconstructs the seismic signals via:

a contractive path that performs multilayer convolutions and contraction to extract a code and contractive features from the seismic data input to the DUnet engine, an expansive path configured to perform multilayer convolutions and expansion of the code to produce expansive features, using the contractive features provided by the contractive path through skip connections, a model level that performs multilayer convolutions on a highest level of the contractive features and a highest level of the expansive features, the highest level of the contractive features and the highest level of the expansive features having a size as the seismic data input, and outputs of the multilayer convolutions are averaged to generate a model output; and a reweighting layer comprising a locally connected layer that receives the model output and applies at least one of spatial and temporarily smooth coefficients and additional multilayer convolutions to preserve a signal amplitude trend of the seismic data to generate the denoised image.

2. The method of claim 1, further comprising training the DUnet engine using training data, which includes a fraction of the seismic data or other seismic data, and processed data corresponding to the fraction of the seismic data or the other seismic data.

3. The method of claim 2, wherein the fraction of the seismic data is selected using an anchor method that automatically extends an initial seismic data subset to the fraction of the seismic data, based on similarity measurements.

4. The method of claim 2, wherein parameters of the DUnet engine are optimized during training using an Adam algorithm.

5. The method of claim 2, further comprising:

validating the training by comparing the processed image produced by DUnet engine and processed data generated without using the DUnet engine.

6. The method of claim 1, wherein the seismic data is acquired during a marine survey with a variable depth streamer, and DUnet engine performs deghosting to produce the processed image.

7. The method of claim 6, wherein the DUnet engine employs generating mirror data from said seismic data, transforming said seismic data and said mirror data into Tau-P domain seismic data, dividing said Tau-P domain seismic data into a plurality of data windows, generating a ghost delay time for each of said plurality of data windows, and/or generating deghosted seismic data based on said ghost delay time to perform the deghosting.

8. A seismic data processing apparatus for exploring an underground formation, the apparatus comprising:

an interface configured to obtain seismic data acquired over an underground formation;

a data processing unit configured to generate a denoised image of the underground formation by reconstructing seismic signals from a noisy input domain of the seismic data using a DUnet engine, wherein the DUnet engine reconstructs the seismic signals via:

a contractive path that performs multilayer convolutions and contraction to extract a code and contractive features from the seismic data input to the DUnet engine, an expansive path configured to perform multilayer convolutions and expansion of the code to produce expansive features, using the contractive features provided by the contractive path through skip connections, a model level that performs multilayer convolutions on a highest level of the contractive features and a highest level of the expansive features, the highest level of the contractive features and the highest level of the expansive features having a size as the seismic data input, and outputs of the multilayer convolutions are averaged to generate a model output; and a reweighting layer comprising a locally connected layer that receives the model output and applies at least one of spatial and temporarily smooth coefficients and additional multilayer convolutions to preserve a signal amplitude trend of the seismic data to generate the denoised image.

9. The seismic data processing apparatus of claim 8, wherein the data processing unit is further configured to perform training of the DUnet engine using training data, which includes a fraction of the seismic data or other seismic data, and processed data corresponding to the fraction of the seismic data or the other seismic data.

10. The seismic data processing apparatus of claim 9, wherein the data processing unit automatically extends an initial seismic data subset to the fraction of the seismic data using an anchor method, based on similarity measurements.

11. The seismic data processing apparatus of claim 9, wherein the data processing unit optimizes parameters of the DUnet engine during the training using an Adam algorithm.

12. The seismic data processing unit of claim 9, wherein the data processing unit is further configured to validate the training by comparing the difference between the processed image produced by DUnet engine and processed data that generated without using the DUnet engine.

13. The seismic data processing apparatus of claim 8, wherein the seismic data is acquired during a marine survey with a variable depth streamer, and DUnet engine performs deghosting to produce the processed image.

14. The seismic data processing apparatus of claim 13, wherein the DUnet engine employs generating mirror data from said seismic data, transforming said seismic data and said mirror data into Tau-P domain seismic data, dividing said Tau-P domain seismic data into a plurality of data windows, generating a ghost delay time for each of said plurality of data windows, and/or generating deghosted seismic data based on said ghost delay time to perform the deghosting.

15. A non-transitory computer readable recording medium storing executable codes that when executed by a computer make the computer perform a seismic exploration method for denoising and/or deghosting seismic data, the method comprising:

obtain seismic data acquired over an underground formation; and generate a denoised image of the underground formation by reconstructing seismic signals from a noisy input domain of the seismic data using a DUnet engine, wherein the DUnet engine reconstructs the seismic signals via:

a contractive path that performs multilayer convolutions and contraction to extract a code and contractive features from the seismic data input to the DUnet engine, an expansive path configured to perform multilayer convolutions and expansion of the code to produce expansive features, using the contractive features provided by the contractive path through skip connections, a model level that performs multilayer convolutions on a highest level of the contractive features and a highest level of the expansive features, the highest level of the contractive features and the highest level of the expansive features having a size as the seismic data input, and outputs of the multilayer convolutions are averaged to generate a model output; and a reweighting layer comprising a locally connected layer that receives the model output and applies at least one of spatial and temporarily smooth coefficients and additional multilayer convolutions to preserve a signal amplitude trend of the seismic data to generate the denoised image.

16. The computer readable recording medium of claim 15, wherein the method further comprises training the DUnet engine using training data, which includes a fraction of the seismic data or other seismic data and processed data corresponding to the fraction of the seismic data or the other seismic data.

17. The computer readable recording medium of claim 16, wherein the fraction of the seismic data is selected using an anchor method that automatically extends an initial seismic data subset to the fraction of the seismic data, based on similarity measurements.

* * * * *